US006295347B1

United States Patent
Fan et al.

(10) Patent No.: US 6,295,347 B1
(45) Date of Patent: Sep. 25, 2001

(54) APPARATUS AND METHOD FOR SUBSCRIBER LOOP POWERED CALLING IDENTITY DELIVERY ON CALL WAITING

(75) Inventors: Yuan-Neng Fan, Scottsdale, AZ (US); Shih-Ming Tung, Taipei Hsien (TW)

(73) Assignee: Fanstel Systems, LLC, Scottsdale, AZ (US)

( * ) Notice: Subject to any disclaimer, the term of this patent is extended or adjusted under 35 U.S.C. 154(b) by 0 days.

(21) Appl. No.: 09/303,708

(22) Filed: Apr. 30, 1999

(51) Int. Cl.[7] .............................. H04M 1/56; H04M 1/00
(52) U.S. Cl. ............................... 379/142.01; 379/142.08; 379/142.04; 379/399.01; 379/399.02; 379/413
(58) Field of Search .................................. 379/142, 201, 379/215, 93.35, 186, 387, 399, 413

(56) References Cited

U.S. PATENT DOCUMENTS

| | | | |
|---|---|---|---|
| 5,583,924 | * 12/1996 | Lewis | 379/142 |
| 5,680,447 | * 10/1997 | Diamond et al. | 379/142 |
| 5,745,557 | * 4/1998 | Anglikowski | 379/177 |
| 5,812,649 | * 9/1998 | Shen | 379/142 |
| 5,836,009 | * 11/1998 | Diamond et al. | 379/142 |
| 5,862,212 | * 1/1999 | Mathews | 379/386 |
| 5,905,786 | * 5/1999 | Hoopes | 379/142 |
| 5,995,611 | * 11/1999 | Mowafy et al. | 379/215 |

FOREIGN PATENT DOCUMENTS

2340342 * 2/2000 (GB) ............................ H04M/15/00

* cited by examiner

Primary Examiner—Duc Nguyen
Assistant Examiner—Quoc Tran
(74) Attorney, Agent, or Firm—Jeffrey D. Moy; Harry M. Weiss; Weiss & Moy, P.C.

(57) ABSTRACT

An apparatus and method for subscriber loop powered calling identity delivery on call waiting apparatus provides battery only operation or extended battery life in a calling identity apparatus intended for off-hook and on-hook operation. The apparatus and method of using comprises a caller identification data receiver coupled to the subscriber loop for decoding caller identification tones and a CAS tone detector for detecting an alerting signal having at least one tone detector power supply input. Further comprised is a power supply circuit wherein the power supply's input is coupled to the subscriber loop for supplying power from the subscriber loop to the CAS tone detector.

20 Claims, 1 Drawing Sheet

Figure 1:
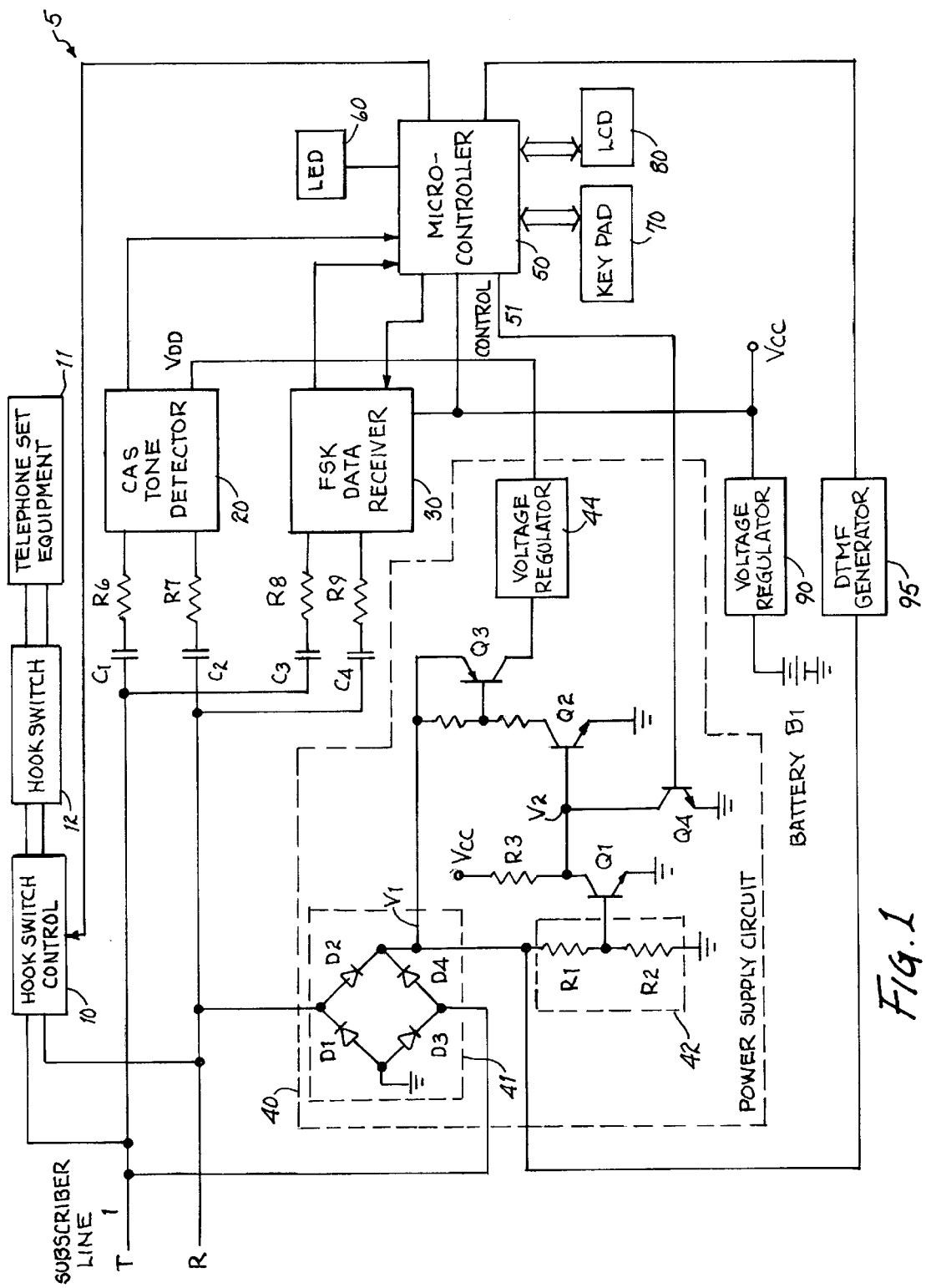

APPARATUS AND METHOD FOR SUBSCRIBER LOOP POWERED CALLING IDENTITY DELIVERY ON CALL WAITING

BACKGROUND OF THE INVENTION

1. Field of the Invention

This invention relates to telephone caller identification apparatus, and more specifically, to a calling identity delivery on call waiting apparatus using subscriber loop power during off-hook operation.

2. Description of the Related Art

Caller identification systems have been in use for a number of years. Operation of the caller identification apparatus requires detection of tones provided by the telephone service provider.

Call waiting service has also been provided by telephone service providers for a number of years. Alerting signals are provided by the service provider to alert the subscriber's equipment that another call is arriving while the telephone receiver is off-hook.

In order to provide caller identification service during off-hook operation, the caller identification apparatus must detect the Customer Premises Equipment Alerting Signal (CAS). This signal is provided by the Calling Identity on Call Waiting service (CIDCW).

Detectors for the CAS signal consume relatively large amounts of power, as the detection of the CAS tone is not as simple as detecting a ringing or hook reversal condition. The CAS detector must operate while the subscriber loop is in the off-hook condition and consumes power continuously while the user is connected to the service. Therefore, while caller identification apparatus in the present state of the art can be powered by a small battery, operation of caller identification in conjunction with call waiting services however requires more power. In response to the power requirement problem, caller identification apparatus designed for use with call waiting services are powered by a separate power supply connected to the subscriber's AC power service.

This is a cost disadvantage and is also an inconvenience to the subscriber. A power outlet may not be available near the desired location of the caller identification apparatus and a complete system requires an additional power supply and associated packaging, storage and shipping costs.

The present apparatus and method provide a solution to the problem by using the subscriber loop to power the CAS tone detectors while the telephone is off-hook.

SUMMARY OF THE INVENTION

It is an object of the present invention to provide apparatus and methods which power CAS detection circuits for caller identity notification from the subscriber loop while a telephone is off-hook.

It is another object of the present invention to provide control of the off-hook and on-hook state and to alert the central office that caller identification tones for the incoming call can be sent.

It is a further object of the invention to provide automatic disconnection of the CAS detector power from the subscriber line when the subscriber equipment returns to an onhook condition.

The foregoing and other objects, features, and advantages of the invention will be apparent from the following, more particular, description of the preferred embodiment of the invention, as illustrated in the accompanying drawings.

BRIEF DESCRIPTION OF THE PREFERRED EMBODIMENTS

According to one aspect of the invention, a caller identification apparatus for connection to a subscriber loop is disclosed. The caller identification apparatus for connection to a subscriber loop comprises: a caller identification data receiver coupled to the subscriber loop for decoding caller identification tones; a CAS tone detector for detecting an alerting signal having at least one tone detector power supply input; a hook switch coupled to the subscriber loop for controlling the hook state of the subscriber loop; a power supply circuit having at least one power supply output and a power source; wherein said at least one power supply output is coupled to said at least one tone detector power supply input; and wherein said power source is coupled to said subscriber loop for supplying power from said subscriber loop to said CAS tone detector.

According to another aspect of the invention, a method for powering a calling identity delivery on call waiting detector from subscriber loop power is disclosed. The method for powering a calling identity delivery on call waiting detector from subscriber loop power comprises the steps of: detecting an off-hook condition; supplying power to a CAS signal detector from the subscriber loop; removing the off-hook condition when a CAS signal is received; restoring the off-hook condition; receiving caller identification tones; and removing the power from the CAS signal detector when an on-hook condition is detected.

BRIEF DESCRIPTION OF THE PREFERRED EMBODIMENT

FIG. 1 is a simplified electrical diagram showing the components of the present invention.

DESCRIPTION OF THE PREFERRED EMBODIMENTS

Referring to FIG. 1, a simplified electrical diagram showing the components of the present invention is shown (the "apparatus 5" hereinafter). A preferred embodiment of the apparatus 5 comprises a CAS tone detector 20, an FSK calling identity data receiver 30, a power supply circuit 40 and a microcontroller 50 interfaced to a keypad 70 and display 80.

One embodiment of the apparatus 5 of the present invention is intended for use within, or as an integral part of, a telephone set. This integral embodiment uses the hook control and hook switch circuits of the telephone set for on-hook/offhook signaling.

An alternative embodiment of the apparatus 5 of the present invention is intended as a standalone caller identification apparatus 5 physically separate, though electrically coupled to, a telephone set (not shown herein). In this alternate embodiment, a hook switch and hook control are included within the apparatus 5.

The microcontroller 50 controls the operation of the apparatus 5, sensing the arrival of a call, assembling the output of the caller identity circuits and controlling the hook switch 12 and to prompt for the identity of calls that arrive during off-hook operation. The microcontroller 50 uses memory (not shown herein) to store its programs and caller identification data.

A display 80 and keypad 70 optionally provide an interface to the user. The display 80 is used to display the information provided concerning the caller and other information to assist the user in operation of the apparatus 5. In a preferred embodiment the display is a liquid crystal display (LCD), but many other display methods are known to those skilled in the art including LED displays for example. The keypad 70 provides user control of the apparatus 5, including such features as one button return call capability, review or deletion of caller-ID data stored in the memory.

An LED 60 may also be optionally coupled to the apparatus 5 in order to provide a visual indication to the user that a new call has arrived.

The FSK calling identity receiver 30 decodes the calling identity tones and provides them to the microcontroller 50 for storage and display processing.

The CAS tone detector 20 detects the presence of an alerting signal from the telephone service provider, conveyed via the subscriber line 1, indicating a call is arriving during an existing call.

The power supply circuit 40 operates the CAS tone detector 20 during the off-hook condition. The balance of the circuitry is powered by battery B1. Voltage Regulator 90 provides regulated power from the battery B1 to the electronics that require it such as the FSK data receiver 30 and the microcontroller 50. Power to the CAS Tone Detector 20 is only required when the apparatus 5 is in off-hook operation.

The FSK Data Receiver 30, decodes FSK signals presented by calling identification services and provides data output to the microcontroller 50. CAS Tone Detector 20 detects the presence of a Customer Premises Equipment Alerting Signal (CAS) when an incoming call occurs during an existing call.

Power for the CAS Tone Detector 20, is provided by a Power Supply Circuit 40. The Power Supply Circuit 40 contains a Diode Bridge 41 comprising diodes D1, D2, D3, and D4. This Diode Bridge 41 provides the same DC polarity for the Power Supply Circuit 40 voltage V1, no matter what the hook polarity or ringing condition is. A Voltage Divider 42 comprising resistors R1 and R2, controls the bias current to transistor Q1. The values of R1 and R2 are chosen such that the on-hook voltage at the output of the diode bridge 41 will turn transistor Q1 on, but the off-hook voltage will not. This places the Power Supply Circuit 40 in a high impedance state which does not load the Subscriber Line 1 when the apparatus is in an on-hook condition.

Transistor Q4 is controlled by control 51 of the microcontroller 50. When control 51 of the microcontroller 50 is in the logical high state, transistor Q4 is on. Transistor Q4 is activated before the microcontroller 50 checks the extension off-hook condition and signals the telephone service provider to send calling identity tones. Transistor Q4 disables the supply current to the Voltage Regulator 44, so that the Power Supply Circuit 40 presents a high impedance to the subscriber line.

The state of transistor Q2 is controlled by the state of transistors Q1 and Q4. When transistor Q1 is on (off-hook condition), or Q4 is on, the voltage at the base of Q2 will be low. Transistor Q2 will be off, which will allow no current to flow through the base of Q3, so Q3 will be off.

Transistor Q3 provides DC voltage input to the Voltage Regulator 44. When transistor Q3 is off, the Voltage Regulator 44 input voltage is low and so no current is drawn from the output of the Diode Bridge 41, other than the current drawn through R1. This causes the Power Supply Circuit 40 to present a high impedance to the Subscriber Line 1.

When the subscriber line 1 is in the off-hook condition due to Equipment 11 being in an off-hook state, the voltage at the output of the Diode Bridge 41 will drop to approximately 6 volts. This will cause Transistor Q1 to be in the off state, turning Transistors Q2 and Q3 on. Voltage Regulator 44 will be supplied with current from the base of Transistor Q3 and the output of the Voltage Regulator 44 supplies CAS Tone Detector 20 with power, enabling its operation.

The CAS Tone Detector 20 is optionally AC coupled to the subscriber line 1 by Capacitors C1 and C2 and Resistors R6 and R7. These components are not necessary for all circuits which embody the present invention. Also, the FSK Data receiver is optionally AC coupled by capacitors C3 and C4 and resistors R8 and R9. These components are not necessary for all circuits which embody the present invention When a CAS tone is detected the CAS Tone Detector 20 output causes the microcontroller 50 to wake up, the microcontroller 50, controls the Hook Switch control 10 and transistor Q4, to set the Subscriber Line 1 to the off-hook state temporarily and disable the Power Supply Circuit 40. If no extension, connected elsewhere to the subscriber line 1, is off-hook, microcontroller 50 sends a DTMF tone to the service provider. This is necessary to acknowledge the receipt of the CAS signal, allowing the caller identification data to be transmitted from the telephone service provider. The transmitted caller identification data comprises the call time and telephone number, and if available, the caller's name.

The caller identity is then received by the FSK Data Receiver 30 and provided to the microcontroller 50 which processes the data for display on LCD 80. The microcontroller 50 can then return to sleep mode until another CAS tone is received, or the hook state of the Subscriber Line 1 changes. This provides for low power battery operation while allowing the CAS Tone Detector 20 to be fully operational during calls.

The operation of the preferred embodiment of the subscriber loop powered calling identity delivery on call waiting apparatus is further embodied in a method for powering a calling identity delivery on call waiting apparatus from the subscriber loop.

The method comprises supplying power to the CAS Tone Detector 20 when the Equipment 11 is in off-hook state, removing power from the CAS Tone Detector 20 and disconnecting the Equipment 11 from the subscriber line to generate an off-hook acknowledge to the telephone service provider, and restoring power to the CAS Tone Detector 20 after a time out or after the caller identification tones are received by the FSK Data Receiver 30.

Two embodiments of the present invention are contemplated. A first embodiment is an apparatus for incorporation within a telephone set. In this embodiment, the Hook switch control 10 is the switch that is used by the telephone set to indicate that the user has selected an off-hook state by raising the handset, pressing a call button, or other means.

In a second embodiment, the telephone set is external to the present apparatus, and the embodiment of the present apparatus will incorporate a connector for attachment to the telephone set. In this embodiment, the Hook switch control 10, comprises a relay or electronic switch to isolate at least one of the two subscriber loop connections from the Equipment 11, in order to provide an off-hook condition to the subscriber line 1.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A caller identification apparatus for connection to a subscriber loop comprising, in combination:
   a caller identification data receiver coupled to said subscriber loop for decoding caller identification tones;
   a CAS tone detector for detecting an alerting signal having at least one tone detector power supply input;
   a hook switch coupled to said subscriber loop for controlling the hook state of said subscriber loop;
   a power supply circuit having at least one power supply output and a power source, said at least one power supply output is coupled to said at least one tone detector power supply input and said power source is coupled to said subscriber loop for regulating power supplied from said subscriber loop to said CAS tone detector.

2. A caller identification apparatus for connection to a subscriber loop in accordance with claim 1, wherein said apparatus is incorporated within a telephone set.

3. A caller identification apparatus for connection to a subscriber loop in accordance with claim 1, wherein said power supply circuit is automatically disabled when the voltage on said power source rises above a threshold voltage.

4. A caller identification apparatus for connection to a subscriber loop in accordance with claim 3, wherein said apparatus is incorporated within a telephone set.

5. A caller identification apparatus for connection to a subscriber loop in accordance with claim 3, further comprising a microcontroller coupled to said CAS tone detector, said caller identification data receiver, said hook switch, and said power supply circuit, for receiving the output of said CAS tone detector and said caller identification data receiver, and for controlling the state of the hook switch and enabling or disabling said power supply circuit.

6. A caller identification apparatus for connection to a subscriber loop in accordance with claim 5, wherein said apparatus is incorporated within a telephone set.

7. A caller identification apparatus for connection to a subscriber loop in accordance with claim 5, further comprising an LCD display coupled to said microcontroller for displaying caller identification information.

8. A caller identification apparatus for connection to a subscriber loop in accordance with claim 7, wherein said apparatus is incorporated within a telephone set.

9. A caller identification apparatus for connection to a subscriber loop in accordance with claim 7, further comprising a keypad coupled to said microcontroller, for controlling the operation of said caller identification apparatus.

10. A caller identification apparatus for connection to a subscriber loop in accordance with claim 9, wherein said apparatus is incorporated within a telephone set.

11. A caller identification apparatus for connection to a subscriber loop in accordance with claim 5, further comprising a keypad coupled to said microcontroller for controlling the operation of said caller identification apparatus.

12. A caller identification apparatus for connection to a subscriber loop in accordance with claim 11, wherein said apparatus is incorporated within a telephone set.

13. A caller identification apparatus for connection to a subscriber loop in accordance with claim 1 wherein said power supply circuit comprises:
   a bridge rectifier having a bridge rectifier output for maintaining a DC polarity;
   a transistor switch for disabling said power supply circuit when said power source voltage is above a threshold voltage;
   a voltage divider coupled to said output of said bridge rectifier for providing the base current to said transistor switch; and
   a voltage regulator with a control input coupled to the collector of said transistor switch for supplying said at least one power supply output.

14. A caller identification apparatus for connection to a subscriber loop in accordance with claim 13, wherein said apparatus is incorporated within a telephone set.

15. A caller identification apparatus for connection to a subscriber loop in accordance with claim 13, further comprising a microcontroller coupled to said CAS tone detector, said caller identification data receiver, said hook switch, and said power supply circuit, for receiving the output of said CAS tone detector and said caller identification data receiver, and for controlling the state of the hook switch and enabling or disabling said power supply circuit.

16. A caller identification apparatus for connection to a subscriber loop in accordance with claim 15, wherein said apparatus is incorporated within a telephone set.

17. A caller identification apparatus for connection to a subscriber loop in accordance with claim 13, further comprising an LCD display coupled to said microcontroller for displaying caller identification information.

18. A caller identification apparatus for connection to a subscriber loop in accordance with claim 17, further comprising a keypad coupled to said microcontroller, for controlling the operation of said caller identification apparatus.

19. A method for powering a calling identity delivery on call waiting detector from subscriber loop power comprising the steps of:
   detecting an off-hook condition;
   supplying power to a CAS signal detector from the subscriber loop; and
   removing the power from the CAS signal detector when an onhook condition is detected.

20. A method for powering a calling identity delivery on call waiting detector from subscriber loop power comprising the steps of:
   detecting an off-hook condition;
   supplying power to a CAS signal detector from the subscriber loop;
   detecting CAS signals;
   removing said subscriber loop power from said CAS signal detector;
   receiving caller identification tones;
   re-applying said subscriber loop power to said CAS signal detector; and
   removing the power from the CAS signal detector when an onhook condition is detected.

* * * * *